(12) United States Patent
Silvestro et al.

(10) Patent No.: US 11,128,669 B2
(45) Date of Patent: Sep. 21, 2021

(54) METHOD AND SYSTEM FOR INTRODUCING IN-NETWORK SERVICES IN AN END-TO-END COMMUNICATION PATH

(71) Applicant: NEC Laboratories Europe GmbH, Heidelberg (DE)

(72) Inventors: Alessio Silvestro, Bologna (IT); Dirk Kutscher, Elsfleth (DE); Fabian Schneider, Heidelberg-Bahnstadt (DE)

(73) Assignee: NEC CORPORATION, Tokyo (JP)

( * ) Notice: Subject to any disclaimer, the term of this patent is extended or adjusted under 35 U.S.C. 154(b) by 151 days.

(21) Appl. No.: 16/300,118

(22) PCT Filed: May 13, 2016

(86) PCT No.: PCT/EP2016/060894
§ 371 (c)(1),
(2) Date: Nov. 9, 2018

(87) PCT Pub. No.: WO2017/194168
PCT Pub. Date: Nov. 16, 2017

(65) Prior Publication Data
US 2019/0149581 A1    May 16, 2019

(51) Int. Cl.
*G06F 21/45* (2013.01)
*G06F 21/62* (2013.01)
(Continued)

(52) U.S. Cl.
CPC .......... *H04L 63/20* (2013.01); *H04L 63/0428* (2013.01); *H04L 63/08* (2013.01); *H04L 63/0884* (2013.01); *H04L 63/166* (2013.01)

(58) Field of Classification Search
None
See application file for complete search history.

(56) References Cited

U.S. PATENT DOCUMENTS 9,218,264 B2 * 12/2015 Xavier ................ G06F 11/3485
2014/0278623 A1 * 9/2014 Martinez ................ G06Q 10/06
705/7.12
(Continued)

OTHER PUBLICATIONS

Modelling cyber security for software-defined networks those grow strong when exposed to threats. Ahmed. Springer. (Year: 2015).*
(Continued)

*Primary Examiner* — Venkat Perungavoor
(74) *Attorney, Agent, or Firm* — Leydig, Voit & Mayer, Ltd.

(57) ABSTRACT

A method for introducing in-network services in an end-to-end communication path between two hosts includes: providing at least one middlebox entity and performing a registration procedure that includes registering the in-network services together with their respective service level agreements at the at least one middlebox entity; by at least one of the two hosts, sending a subscription for the in-network services to the at least one middlebox entity together with a policy list containing at least host-specific security requirements; by the at least one middlebox entity, evaluating potential conflicts between the host-specific security requirements and the service level agreements of the in-network services, and, in case no conflicts are detected, authenticating the in-network services; and inserting the authenticated in-network services within the end-to-end communication path and starting encrypted communication between the two hosts.

20 Claims, 4 Drawing Sheets

(51) Int. Cl.
*H04L 29/06* (2006.01)
*G06F 21/30* (2013.01)

(56) References Cited

U.S. PATENT DOCUMENTS

| | | | | |
|---|---|---|---|---|
| 2014/0280961 | A1* | 9/2014 | Martinez | H04L 41/5054 |
| | | | | 709/226 |
| 2016/0094581 | A1 | 3/2016 | Kasbekar | |
| 2016/0308734 | A1* | 10/2016 | Feller | H04L 41/16 |
| 2016/0337175 | A1* | 11/2016 | Rao | H04L 49/10 |
| 2017/0171245 | A1* | 6/2017 | Lee | G06F 16/958 |
| 2017/0250892 | A1* | 8/2017 | Cooper | G06F 21/552 |

OTHER PUBLICATIONS

Multi-Context TLS (mcTLS): Enabling Secure In-Network Functionality in TLS. Naylor. ACM. (Year: 2015).*
Rene Hummen et al: "SEAMS: A Signaling Layer for End-Host-Assisted Middlebox Services", Trust, Security and Privacy in Computing and Communications (TRUSTCOMM), 2012 IEEE 11$^{th}$ International Conference On, IEEE, Jun. 25, 2012 (Jun. 25, 2012), pp. 525-532, XP032233455.
David Naylor et al: "Multi-Context TLS (mcTLS)", Special Interest Group on Communication, ACM, 2 Penn Plaza, Suite 701 New York NY 10121-0701 USA, Aug. 17, 2015 (Aug. 17, 2015), pp. 199-212, XP058071186.

* cited by examiner

METHOD AND SYSTEM FOR INTRODUCING IN-NETWORK SERVICES IN AN END-TO-END COMMUNICATION PATH

STATEMENT OF GOVERNMENT SUPPORT

The work leading to this invention has received funding from the European Union's Seventh Framework Programme (FP7/2007-2013) under grant agreement no 607584.

CROSS-REFERENCE TO PRIOR APPLICATIONS

This application is a U.S. National Stage Application under 35 U.S.C. § 371 of International Application No. PCT/EP2016/060894 filed on May 13, 2016. The International Application was published in English on Nov. 16, 2017, as WO 2017/194168 A1 under PCT Article 21(2).

FIELD

The present invention generally relates to a method for introducing in-network services in an end-to-end communication path between two hosts. Furthermore, the present invention relates to a corresponding communication system.

BACKGROUND

Currently there is an increased concern on security and (data) privacy on the Internet that has led several services (e.g., Facebook, Twitter and Google) to offer their services exclusively over HTTPS (HyperText Transfer Protocol Secure) with an increase of encrypted traffic that nowadays is almost a quarter of the overall HTTP requests.

TLS (Transport Layer Security) is the main protocol used for encryption that underlies HTTPS and since it will be the default protocol for all the communication in HTTP/2.0, the portion of encrypted traffic will further increase. The main assumption of TLS is that all the functions must reside at the end hosts, which means that TLS will completely blind any kind of in-network services within the end-to-end path, i.e. in-network functions cannot perform their operation anymore. However, in-network functions are widely used to improve security (e.g., firewall, IDS, etc.) and performance (e.g., cache, data compression, etc.). Because of this limitation, there are usually two main disadvantages:

First, in order to provide security in scenarios that do not respect the end-to-end paradigm, service providers usually do some workarounds that will eventually leak the security requirements that the protocol aims to provide as first main goal and, for instance, will expose user data to some security threats. Furthermore, there is an increased concern on the security requirements perceived on the client side, while they are not aware of the network performance degradation introduced by the enforcement of the security.

Considering, for example, a web server composed of a single content provider, the resources' owner, and multiple edge layers that will handle the incoming traffic on behalf of the content provider. This usually happens either for load balancing or in Content Delivery Networks (CDN). In order to support such architecture, two solutions are usually in place: (I) each edge server shares the authentication credential associated to the content provider; (II) the authentication credential associated to the encryption session between the content provider and a client is kept secret, and any TLS session between a client and the content provider will involve further interactions between the content provider and the edge server, increasing the overall communication overhead.

Another common example is an enterprise network. Usually companies force to have a firewall that usually would not work with encrypted traffic. To avoid that, the company will install a certificate on the employee laptop giving full access to all the data the employee generates.

Second, Internet Service Providers (ISPs) are currently receiving a huge amount of encrypted traffic and since TLS does not allow in-network functions, they are not able to perform any kind of optimization of such traffic (e.g., cache, data compression, etc.). In particular, this leads to an increase of operations costs for ISPs and to a decrease of the network performance for users. Moreover, it hinders collaboration between ISPs and SPs.

Therefore, the present inventors have recognized that there is a strong interest of telecom operators to introduce in-network services. For instance, Vodafone is offering a service called "Secure Networks" that protects its customers from malicious behavior of websites or against malware, spam and virus (https://securenet.vodafone.com/). Basically, they have a huge data base of known threats in the web. They check if requested items match some of resources labeled as "dangerous", and in that case the browser will show a pop-up, alerting customers of the danger. However, according to this solution, like in previous solutions, customers do not have control on what is actually done and how operations are performed on the data customers generate.

SUMMARY

An embodiment of the present invention provides a method for introducing in-network services in an end-to-end communication path between two hosts, which includes: providing at least one middlebox entity and performing a registration procedure that includes registering the in-network services together with their respective service level agreements at the at least one middlebox entity; by at least one of the two hosts, sending a subscription for the in-network services to the at least one middlebox entity together with a policy list containing at least host-specific security requirements; by the at least one middlebox entity, evaluating potential conflicts between the host-specific security requirements and the service level agreements of the in-network services, and, in case no conflicts are detected, authenticating the in-network services; and inserting the authenticated in-network services within the end-to-end communication path and starting encrypted communication between the two hosts.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Embodiments of the present invention improve and further develop a method for introducing in-network services in an end-to-end communication path between two hosts and a communication system in such a way that the introduction of these services can be performed in a highly efficient and flexible way, while keeping some of the security requirements. At the same time, the degree of control of customers towards such in-network services shall be increased.

In accordance with the invention, the aforementioned improvement is accomplished by a method for introducing in-network services in an end-to-end communication path between two hosts, the method including: providing at least one middlebox entity and performing a registration procedure that includes registering in-network services together with their respective service level agreements at the at least one middlebox entity, by at least one of the two hosts, sending a subscription for in-network services to the at least one middlebox entity together with a policy list containing at least host-specific security requirements, by the at least one middlebox entity, evaluating potential conflicts between the host-specific security requirements on the one hand and service level agreements of the in-network services on the other hand, and, in case no conflicts are detected, authenticating the in-network services, and inserting the authenticated in-network services within the end-to-end communication path and starting encrypted communication between the two hosts.

Furthermore, the above improvement is accomplished by a communication system, including: at least two hosts, at least one middlebox entity configured to perform a registration procedure that includes registering in-network services together with their respective service level agreements at the at least one middlebox entity, to receive from at least one of the hosts subscriptions for in-network services together with a policy list containing at least host-specific security requirements, to evaluate potential conflicts between the host-specific security requirements on the one hand and service level agreements of the in-network services on the other hand, and, in case no conflicts are detected, to authenticate the in-network services, and an end-to-end communication path for encrypted communication between the at least two hosts that enables inserting the authenticated in-network services.

According to the invention, the above mentioned improvement is accomplished by providing a middlebox entity as a third trusty entity that authenticates in-network functions. Such architecture provides a sufficiently high level of confidence for users to accept in some scenarios the use of in-network functions rather than just accepting the ones suggested by a server. Embodiment of the invention could be implemented as a network service that offers user controlled composition of "trusted" in-network functions. Consequently, the present invention has the potential to open the market for any third party in-network service, while increasing the control of customers towards such in-network services. According to embodiments fine-grained security control is achieved through formalized stakeholder (user, service provider, network provider) policies that describe which, if any, middleboxes are desired for a specific Internet communication and which operations each of the middleboxes is allowed to perform on which part of the traffic. According to embodiments in-network service providers are enabled to provide formalized middlebox SLAs (Service Level Agreements) that describe the operations of the middlebox entities with respect to the registered in-network services. At the same time, users may be enabled to define their individual security requirements (e.g., browser plugin). In any case, the deployment of middlebox entities in accordance with the present invention provides a communication architecture in which in-network services/functions can be dynamically re-introduced within a secure end-to-end communication path in a user-controlled fashion.

According to an embodiment, the registration procedure includes the step of registering in-network service providers at the at least one middlebox entity. By performing this registration step it is possible to take into account that in real deployment scenarios users will show different levels of confidence to different in-network service providers. For instance, a user will typically have a higher degree of trust towards his own Internet service provider than towards foreign providers.

According to an embodiment, the registration procedure may include the step of registering different instances of already registered in-network services. Different instances of a particular in-network service could provide further information about the location of the in-network function instances within the network (e.g., IP address) and the in-network function instances capabilities that could be used by the middlebox entity to provide further services, for instance to balance the workload of client requests through different instances of the same in-network service.

Embodiments of the invention introduce a logical separation between in-network services and in-networks instances that provides enhanced in-network service providers flexibility and leads basically to the following advantages: The SLAs defined for the in-network services are also valid for in-network instances and will further enhance the control of users towards in-network functions. Furthermore, end-hosts can actually point the same in-network service, for instance a cache from a specific ISP, while in the authentication phase it will be translated in the actual instance to use. This aspect gives an enhanced flexibility to in-network service providers that can dynamically instantiate several instances, for instance to balance the workload, transparently to end-hosts.

According to embodiments of the invention, in-network service providers are enabled to "translate" a single in-network service into multiple in-network instances transparently to end-hosts (thereby realizing a chain of in-network functions). For instance, for technical reasons a single in-network service might be composed by multiple functions while it still represents a single service. Thus, a single in-network function can be translated during the authentication phase in a chain of in-network instances transparently to end-hosts.

According to an embodiment, a policy list may contain, in addition to information about the host-specific security requirements, a definition of the domain to which the policies apply, a list of middlebox entities that are to be enabled within the end-to-end communication path, and/or information on which operations each of the middlebox entities is allowed to perform on which part of the data for each in-network service specified in the policy list.

According to an embodiment, the service level agreements provided to a middlebox entity while registering an in-network service can be regarded as a sort of contract between the in-network service provider and the middlebox entity that represents a legal instrument that can be used against a malicious behavior of in-network functions. In particular, these SLAs may define the function(s) that can be performed by the in-network nodes that execute the in-network service (e.g., firewall, IDS, etc.), the portion of data the in-network nodes require to have access to, the operation required to be performed on the data (i.e., R, R/W), and/or a list of operations that the in-network service will not do (e.g., selling data to a third party).

According to an embodiment, it may be provided that a list of in-network functions to be introduced within the end-to-end communication path is negotiated by either of the two hosts during communication establishment between the two hosts, for instance in case of using mcTLS, during the mcTLS handshake phase.

With respect to a particularly high degree of flexibility, according to an embodiment it may be provided that several different in-network services are employed within a single end-to-end communication path, where these different in-network services are authenticated from different independent middlebox entities. In such a scenario the hosts may be configured to send different subscription requests to the different independent middlebox entities.

However, with respect to a reduction of communication overhead (that would result from multiple requests towards multiple middlebox entities), according to an embodiment an orchestration layer may be provided above the different independent middlebox entities, where the hosts in such scenario may be configured to send only a single subscription request to the orchestration layer. The different independent middlebox entities may authenticate the in-network services locally, and may report back the authentication to the orchestration layer. Consequently, the orchestration layer will be configured to receive subscription requests from the hosts, and to receive information about local authentication of in-network services from the different independent middlebox entities. In other words, the orchestration layer is the component that receives the subscription requests from the end hosts and resolves them. In particular, according to an embodiment the orchestration layer may perform further sub-subscription to each single middlebox entity and with the answer from the local middlebox entities it will answer, one time, with all the information needed to authenticate each single in-network instance.

According to an alternative embodiment, which also provides a reduction of communication overhead, a federation of middlebox entities may be provided, where each middlebox entity of the federation either resolves incoming subscription requests locally, or forwards them to another middlebox entity of the federation.

According to an embodiment, the involved middlebox entities may comprise a policy engine that is configured to match incoming policies and service level agreements of registered in-network services. In particular, this policy engine may be configured to control whether service level agreements of registered in-network services that are introduced within the communication end-to-end path respect the host's security requirements defined through the policy lists.

There are several ways how to design and further develop the teaching of the present invention in an advantageous way. To this end it is to be referred to the following explanation of preferred embodiments of the invention by way of example, illustrated by the drawings. In connection with the explanation of the preferred embodiments of the invention by the aid of the drawings, generally preferred embodiments and further developments of the teaching will be explained.

Generally, embodiments of the present invention as described hereinafter in detail reintroduce in-network services/functions within a secure end-to-end communication path in a network, while keeping some of the security requirements or at least to have a certain degree of control over the introduced intermediate nodes that execute/provide the respective in-network services/functions.

In prior art, there exists already an approach that is termed multi-context TLS, mcTLS, which is built as an extension of TLS (for reference, see David Naylor, Kyle Schomp, Matteo Varvello, Ilias Leontiadis, Jeremy Blackburn, Diego R. López, Konstantina Papagiannaki, Pablo Rodriguez Rodriguez, and Peter Steenkiste: "Multi-Context TLS (mcTLS): Enabling Secure In-Network Functionality in TLS", in *SIGCOMM Comput. Commun. Rev.* 45, 4 (August 2015), 199-212. DOI=http://dx.doi.org/10.1145/2829988.2787482). This approach, which tries to take into account the presence of middleboxes, defines Encryption Context that basically divide the data in different context and it enables different permissions (e.g., R, R/W) on different portions of the data (i.e., context) to different middleboxes. For instance, it enables to access the part of the data named A with read permission to the middlebox 1, and to the data B with read and write permissions to the middlebox 2. Furthermore, it enables end hosts to detect illegal data modifications, for instance, if a middlebox forwards modified data on which it had only read access. Additionally, mcTLS requires authorization from both end hosts to insert intermediate nodes within the end-to-end path; the encryption key used to access the data by each middlebox is composed by two half keys, provided by each end host.

The main drawback of mcTLS is that there is no control over in-network functions once they receive the approval from both end hosts to have read access on the data. Furthermore, the list of in-network functions to introduce and to whom end hosts should trust is suggested by one of the end hosts. Usually it is the server side during mcTLS handshake that suggests such list, while clients can accept or deny to insert them within the end-to-end path. Typically, however, there will be not enough level of knowledge on the side that does not propose such list to trust intermediate nodes suggested by the other side. Thus, even if mcTLS enables to insert "trusted" in-network functions, the overall protocol is based on the trust that one side has towards the other side, which eventually is not that high.

Figure 1:
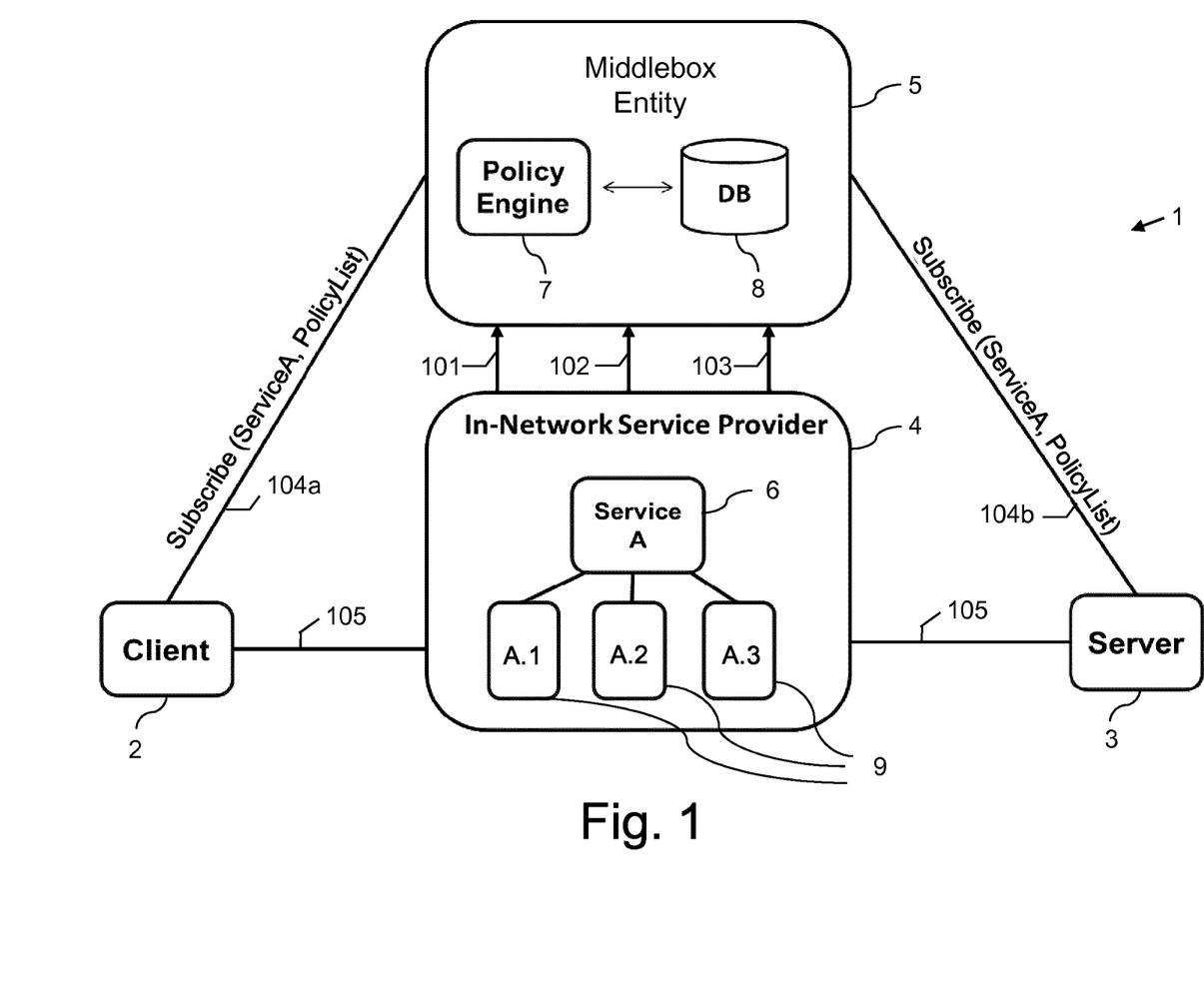
FIG. 1 is a schematic view illustrating the general architecture of a communication system in accordance with an embodiment of the present invention.

An embodiment of the present invention that addresses the above problems is illustrated in FIG. 1, which generally relates to a communication architecture that facilitates a security and privacy preserving user-driven management of in-network functions, which identifies a set of middleboxes between a client and server.

Specifically, FIG. 1 depicts a communication system 1 including two hosts, client 2 and server 3, with an end-to-end communication path established between these two hosts 2, 3. Furthermore, FIG. 1 depicts an in-network service provider 4 offering in-network service/function A, as well as a middlebox entity 5. This middlebox entity 5, which can be regarded as a 'middlebox store' for in-network services 6, is the key component of the system. Basically, as will be described in more detail below, it matches incoming policies and pre-registered middlebox SLAs (Service Level Agreements). The matching is performed by a policy engine 7 that is connected to database 8 where all the SLAs are stored.

Policy engine 7 is configured to generate a list of middleboxes to be used, thereby enforcing the end hosts policies.

In the communication system 1 of FIG. 1, the provision/introduction of in-network services/functions 6 within the end-to-end communication path between client 2 and server 3 is performed in a dynamic and user controlled fashion, by executing the following phases: registration (phase 1), in-network service authentication (phase 2), and communication (phase 3). Hereinafter, these phases will be described in detail:

The registration phase (phase 1) may be composed of several sub-steps. In a first sub-step, shown in step 101 in FIG. 1, the different providers 4 (e.g., Google, Netflix, Deutsche Telekom, etc.) of in-network services 6 may be registered. This in-network service provider 4 registration takes into account the fact that the same in-network service 6 provided by different in-network service providers 4 will typically have different levels of confidence from users. For instance, a user would normally trust more his/her own ISP because of the contract in place between the two.

In a next sub-step of the registration phase, shown at 102, the in-network service 6 registration is performed. Specifically, in this sub-step the in-network service providers 4 register the in-network services 6 they are willing to implement together with the corresponding Service Level Agreement (SLA) at the middlebox entity 5.

In a next sub-step (denoted 103 in FIG. 1), once an in-network service 6 itself has been registered, the in-network service provider 4 can register each instance 9 of the service 6 that will actually be used by the communicating hosts 2, 3. For instance, during this registration phase, instances 9 could provide further information about the location of the in-network function instances within the network (e.g., IP address) and the capabilities of the nodes that provide/execute the instances. These information could be used by the middlebox entity 5 to provide further services, for instance to balance the requests workload through different instances 9 of the same service 6. In the embodiment illustrated in FIG. 1 the only service 6 to be implemented (denoted service 'A') comprises three different instances 9 (denoted 'A.1', 'A.2' and 'A.3').

The next phase (phase 2) is the in-network service 6 authentication, i.e. the process to authenticate in-network services 6 that will be used within the end-to-end communication path. The list of in-network functions to introduce within the end-to-end path is negotiated during the communication establishment between the client 2 and the server 3 (e.g., in case of using mcTLS, during the mcTLS handshake phase), by either the server 3 or the client 2. The authentication process may follow a publish/subscribe paradigm. In particular, during the subscription to a specific service 6, the client 2 sends also a policy list (as shown in step 104a in FIG. 1).

The policy list defines fine-grained security requirements needed by the client 2. In particular, it defines the domain (e.g., my-bank.com, my-video-streaming.com, etc.) to which the policies are to be applied. Furthermore, it may contain a list of those middlebox entities 5 deployed in the network that are to be enabled within the end-to-end communication path. Still further, it may contain an indication of the part of the data users want them to access with the relative permissions for each of the in-network services/functions 6 specified within the policy list. This means that users can choose to enable in-network functions to access part of the data they generate (for instance, granting access to HTTP header rather than HTTP body, etc.). In the end, the policy list may also contain specifications of the desired behavior while users are in private browsing. Table 1 below shows an example of an implementation of a policy list in accordance with embodiments of the present invention:

TABLE 1

| Domain | Mbox [ . . . ] | Data [ . . . ] | Permissions [ . . . ] | Private Browsing |
|---|---|---|---|---|
| * | Firewall | [1] | R | — |
| Mybank.com | — | — | — | — |
| MyVideoStreaming.com | Video encoder | [video part] | R/W | — |

The same subscription step as described above for the client 2 may be executed by the other communication partner, i.e. server 3 (as shown in step 104b in FIG. 1).

The middlebox entity 5, once having received the policy list(s), will evaluate through policy engine 7 potential conflicts between the communicating hosts' security requirements and in-network services' SLAs. If no conflict is detected, the middlebox entity 5 will authenticate the respective in-network service 6. Furthermore, it will publish information to the communicating hosts 2, 3 about the service instances 9 to use.

The next phase (phase 3) is the phase in which the actual communication takes place. That is, once the end hosts, i.e. client 2 and server 3 in the embodiment of FIG. 1, have negotiated and authenticated the in-network functions 6 and no conflict has been detected between the security requirements (as defined in the respective policy list of the client 2 and, depending on the implementation, also of the server 3) and the in-network functions' SLAs, the 'secure' communication can start. For this communication, an encryption protocol will be used that enables to insert in-network services 6 within the end-to-end communication path. Preferably, the protocol also enables fine-grained access to the data being exchanged between the communicating hosts 2, 3. Since mcTLS is the protocol that currently provides these characteristics, the communication can be performed through a standard mcTLS secure channel. However, as will be easily appreciated by those skilled in the art, embodiments of the present invention can also work with any other protocol that provides the above-mentioned features.

With respect to practical implementations of embodiments of the present invention it is considered suitable to not only have a single middlebox entity 5. The reason for this is that a middlebox entity 5 in the context of embodiments of the present invention actually functions as a kind of store from the perspective of end-users. Therefore, these entities should be entities towards which users have a certain degree of confidence. For these reasons, in practical scenarios it proves to be beneficial to have multiple such entities, in particular for different (big) providers. For instance, telecom operators will provide in-network services 6 for network performance, while other providers will provide additional services 6 to the communication. Of course, this will generate a system where users might have different degrees of confidence towards different middlebox entities 5. Because of the complexity of the network and the variety of services 6 that could be in place, in practical scenarios it will likely be the case to use several in-network services 6 within a single end-to-end communication path, eventually authenticated from different middlebox entities 5. For this reasons, the authentication can be implemented in several way, as will be described hereinafter in connection with FIGS. 2-4 (where like reference numerals denote like components and/or functions).

Figure 2:
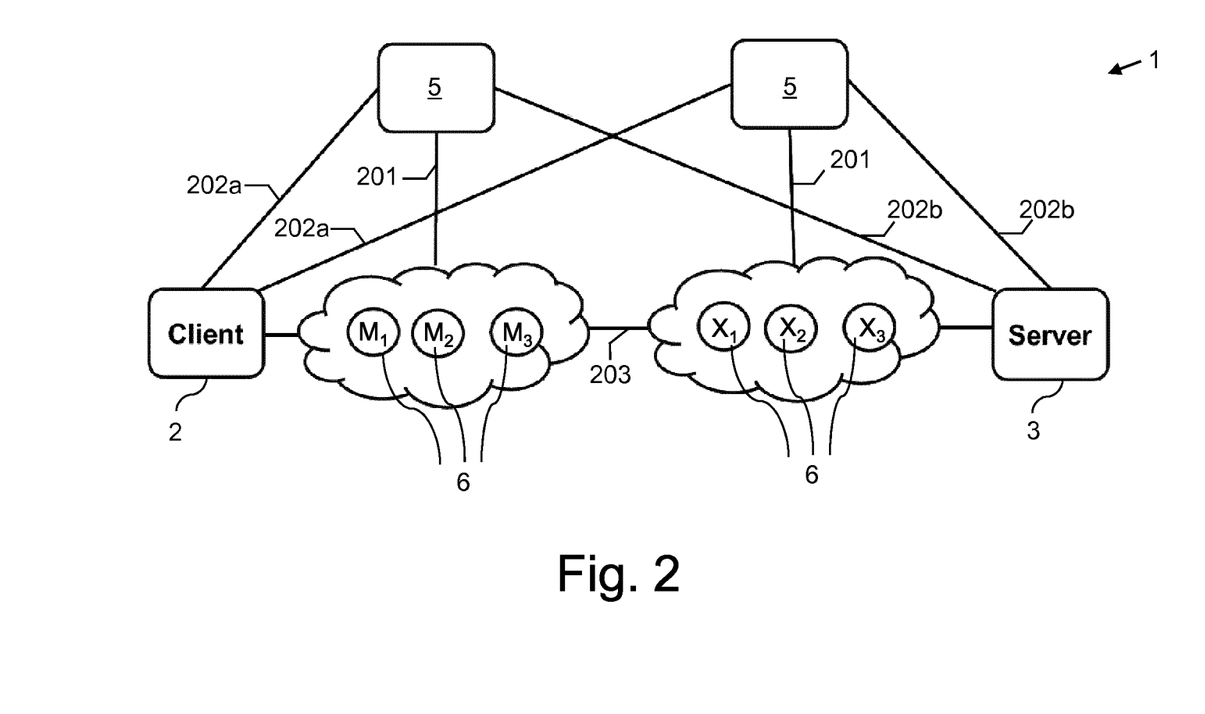
FIG. 2 is a schematic view illustrating a system with multiple independent middlebox stores in accordance with an embodiment of the present invention.

FIG. 2 illustrates an embodiment of the present invention where multiple independent middlebox entities 5 are provided. In FIG. 2, the in-network services 6 and their instances are depicted in different cloud symbols (service $M_1$, $M_2$ and $M_3$ in the left cloud, and service $X_1$, $X_2$ and $X_3$ in the right cloud) to indicate that the in-network services are not only in one specific place, but may be distributed over the network and provided by multiple in-network service providers. The three phases of registration, authentication and communication basically follow the corresponding phases of FIG. 1, however, with the following differences:

In the registration phase, the in-network services 6 register themselves on the related middlebox entities 5, as shown in steps 201. (In this context, 'related' reflects the situation that each middlebox entity 5 will authenticate a specific set of in-network functions over which it has a certain degree of control). In the authentication phase, a communicating host that wants to insert in-network services 6 provided by two or more different middlebox entities 5 performs different subscription requests to each single middlebox entity 5, as shown in steps 202a for the client 2 and in steps 202b for the server 3.

The encrypted communication between client 2 and server 3, as shown at 203, can then insert the authenticated in-network services 6.

Figure 3:
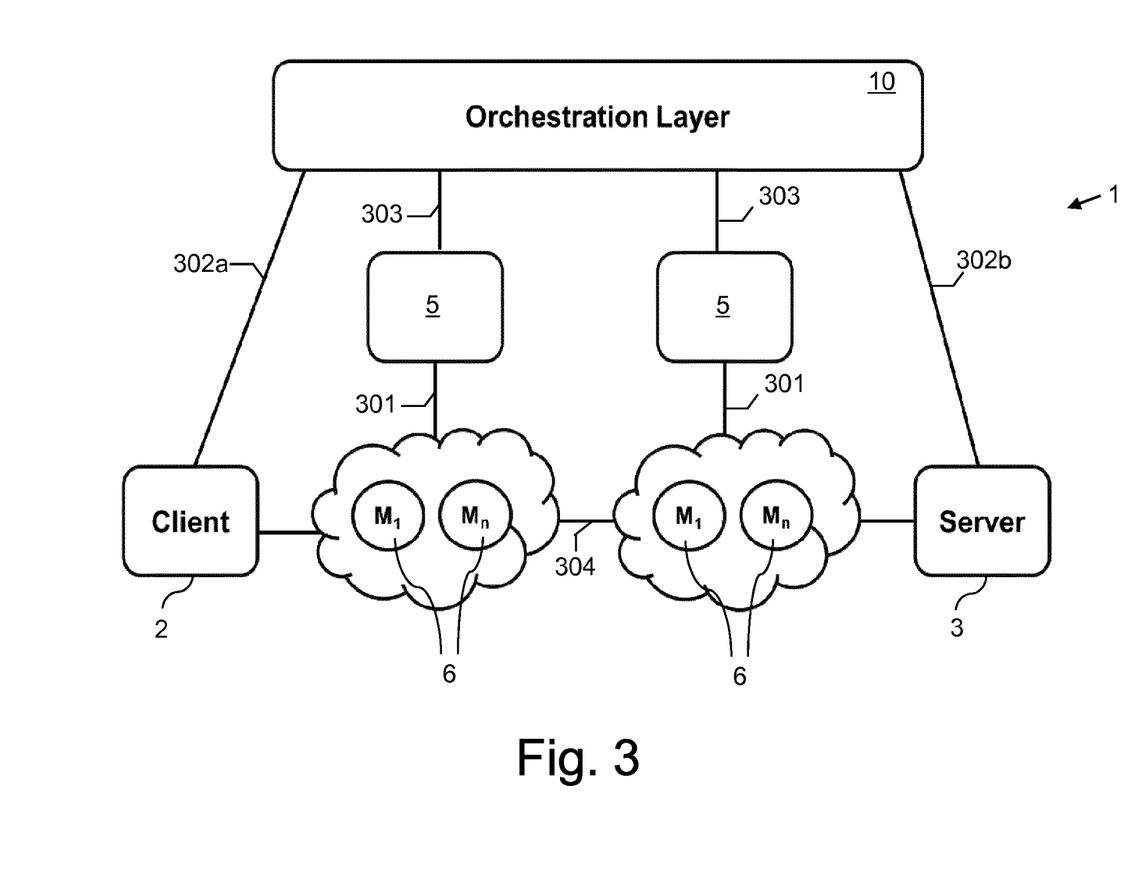
FIG. 3 is a schematic view illustrating a system with an orchestration layer in accordance with an embodiment of the present invention.

The solution described above in connection with FIG. 2 presents some communication overheads due to the multiple requests towards multiple middlebox entities 5. Therefore, FIG. 3 illustrates an embodiment of the present invention where these disadvantages are circumvented. According to this embodiment an orchestration layer 10 is provided above the different middlebox entities 5.

Like in the embodiment of FIG. 2, in the registration phase, at first the in-network services 6 (generally denoted $M_1, \ldots, M_n$ in FIG. 3) register themselves on the related middlebox entities 5, as shown in steps 301.

The authentication phase is divided into two sub-steps: In a first sub-step, the client 2 (and/or the server 3) who wants to insert in-network services 6 provided by multiple middlebox entities 5 performs a single request to the orchestration layer 10, as shown in step 302a for the client 2 and in step 302b for the server 3. In a second sub-step, each single middlebox entity 5 authenticates locally the in-network services 6 and answers the orchestration layer 10, as shown in step 303. This answer, which can be regarded as a kind of second subscription from the orchestration layer 10 to each middlebox entity 5, includes information about the instances to use and the related SLAs. Then, a policy engine on the orchestration layer 10 will check for potential conflict with all the SLAs coming from the different middlebox entities 5.

The encrypted communication between client 2 and server 3, as shown at 304, can then insert the authenticated in-network services.

Figure 4:
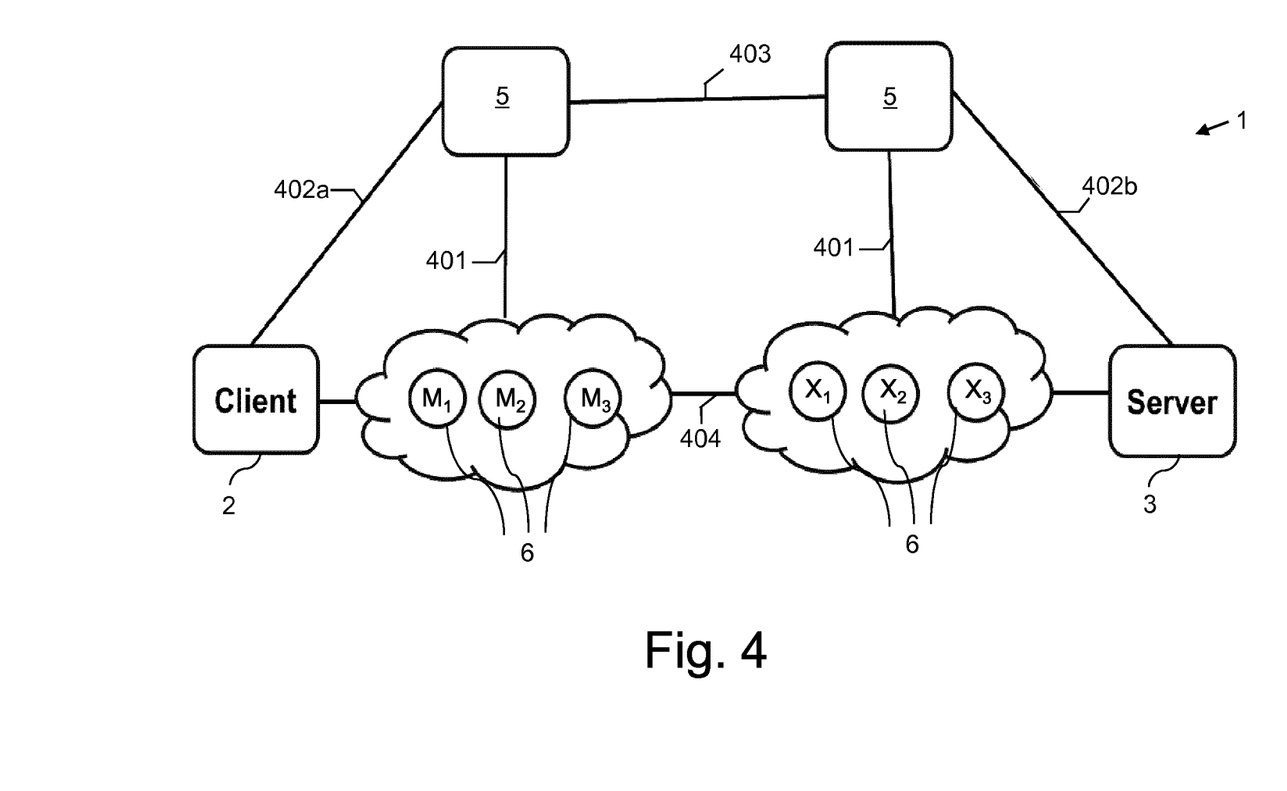
FIG. 4 is a schematic view illustrating a system with a federation of middlebox entities in accordance with an embodiment of the present invention.

Finally, FIG. 4 illustrates an embodiment of the present invention that relates to a system 1 including a federation of middlebox entities 5. Like in the embodiments of FIGS. 2 and 3, in the registration phase, at first the in-network services 6 (denoted $M_1$, $M_2$ and $M_3$ in FIG. 4) register themselves on the related middlebox entities 5, as shown in the steps 401.

In this embodiment, the authentication phase is again divided into two sub-steps: The client 2 (and/or the server 3) who wants to insert in-network services 6 provided by multiple middlebox entities 5 performs a single request (that includes all in-network services 6 that the client/server 2/3 wishes to use) and sends this single request to a middlebox entity 5 that is related to one of the in-network services 6 contained in the respective request (e.g. to the first in-network service 6 that has to be inserted), as shown in step 402a for the client 2 and in step 402b for the server 3. Each of the middlebox entities 5 tries to resolve incoming requests for in-network services 6 and, if it is not able to resolve it locally, it forwards them to another one of the middlebox entities 5 (e.g. to the topologically closest one), as shown in step 403.

The encrypted communication between client 2 and server 3, as shown at 404, can then insert the authenticated in-network services 6.

In summary, embodiments of the present invention provide one or more of the following advantages:

1) Third trusty entity: Having a third entity that authenticates in-network functions gives the right level of confidence for users to accept in some scenarios the use of in-network functions rather than just accepting the ones suggested by the server. In particular, the invention can be suitably used by ISPs to gain back some functions in order to improve the network performance (e.g., cache, video transcoder, etc.). For instance, an ISP that would like to introduce a web cache, in order to reduce the overall network traffic, will ask the permission from clients to do so, offering them to have a reduction over the DSL costs. Users would most likely give access to part of their data, for instance only to YouTube traffic, to their ISP whom they already have a contract in place.

2) Dynamic security requirement: Currently, the security means either to use HTTPS, or to not use it. Embodiments of the present invention enable to define fine-grained security requirements through the policy list. For example, end-hosts might want to have high level confidentiality for their online banking application, while they want to enable a cache in-network service while video streaming.

3) Dynamic performance requirements: Inserting in-network services within an end-to-end path will of course decrease the security requirements in general, but they usually bring additional features to the end-to-end connection. Clients aware of the performance improvements given by some in-network services might choose to relax some security requirements gaining back some network performance improvements. For instance, users will not give access to any in-network functions while on the bank web site, while they would relax the security requirement on some domains to have a faster connection (e.g., video streaming domains).

4) Increased control over in-network functions: The Service Level Agreement (SLA) between in-network service providers and middlebox entities is a specific and technical description of the functions performed by in-network services and, furthermore, it represents a legal means that can be used against in-network service providers by end hosts in case of malicious behavior.

5) Security requirement enforcement: The policy engine within the middlebox entities is the component in charge to control if SLAs' related to in-network functions introduced within the end-to-end path respect the users' security requirements defined through the policy list.

6) Business value: Currently, if ISPs want to access users' data, in general they negotiate it with the users' service providers, because these service providers, when users sign up to the service they provide (e.g., Facebook), own all the data users generate. However, embodiments of the present invention enable single users to give access to third party services, thus increasing the value of the data perceived by users and opening a new side of collaboration.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for introducing in-network services in an end-to-end communication path between two end hosts, the in-network services being provided by at least one in-network service provider, the method comprising:
    performing, by at least one middlebox entity, a registration procedure that comprises registering the in-network services together with their respective service level agreements;
    receiving, by the at least one middlebox entity, a subscription for the in-network services from at least one of the two end hosts together with a policy list containing at least host-specific security requirements
    evaluating, by the at least one middlebox entity, potential conflicts between the host-specific security requirements and the service level agreements of the in-network services, and, in response to no conflicts being detected, authenticating, by the at least one middlebox entity, the in-network services; and
    inserting, by the at least one middlebox entity, the authenticated in-network services within the end-to-end communication path and enabling, by the at least one middlebox entity, encrypted communication between the two end hosts to start,
    wherein the at least one middlebox entity is independent from the two end hosts.

2. The method according to claim 1, wherein performing, by the at least one middlebox entity, the registration procedure comprises a step of registering the at least one in-network service provider, and
    wherein the middle box entity is independent from the at least one in-network service provider, and
    wherein the at least one in-network service provider is independent from the two end hosts.

3. The method according to claim 1, wherein performing, by the at least one middlebox entity, the registration procedure comprises a step of registering different instances of the already registered in-network services.

4. The method according to claim 1, wherein the policy list further contains a definition of a domain to which policies of the policy list apply, a list of middlebox entities to enable within the end-to-end communication path, and/or information on which operations each of the middlebox entities is allowed to perform on which part of the data for each in-network service specified in the policy list.

5. The method according to claim 1, wherein the service level agreements provided to the at least one middlebox entity while registering an in-network service defines functions implemented by network nodes that execute the in-network service, the portion of data the network nodes require to have access to, the operations required to be performed on the data, and/or a list of operations that the in-network service will not execute.

6. The method according to claim 1, wherein a list of in-network functions to be introduced within the end-to-end communication path is negotiated during a handshake phase by both of the two end hosts.

7. The method according to claim 1, wherein several different in-network services are employed within a single end-to-end communication path that are authenticated from different independent middlebox entities.

8. The method according to claim 7, wherein the two end hosts send different subscription requests to the different independent middlebox entities.

9. The method according to claim 7, wherein an orchestration layer is provided above the different independent middlebox entities, wherein the two end hosts send a single subscription request to the orchestration layer, and wherein the different independent middlebox entities authenticate the in-network services locally.

10. The method according to claim 7, wherein a federation of middlebox entities is provided, wherein each middlebox entity of the federation either resolves incoming subscription requests locally, or forwards them to another middlebox entity of the federation.

11. The method according to claim 1, wherein the two end hosts are two end users.

12. The method according to claim 11, wherein the two end users are one client and one server.

13. A communication system, the communication system comprising:
    at least two end hosts;
    at least one middlebox entity, which is configured:
    to perform a registration procedure that comprises registering in-network services together with their respective service level agreements;

to receive from at least one of the at least two end hosts subscriptions for the in-network services together with a policy list containing at least host-specific security requirements; and to evaluate potential conflicts between the host-specific security requirements and the service level agreements of the in-network services, and, in response to no conflicts being detected, to authenticate the in-network services, and an end-to-end communication path for encrypted communication between the at least two end hosts that enables the authenticated in-network services to be inserted by the at least one middlebox entity, wherein the at least one middlebox entity is independent from the two end hosts.

14. The system according to claim 13, wherein the at least one middlebox entity comprises a policy engine configured to match incoming policies and the service level agreements of the registered in-network services.

15. The system according to claim 14, wherein the policy engine is configured to control that the service level agreements of the registered in-network services that are introduced within the end-to-end communication path respect the at least two end host's security requirements defined through the policy list.

16. The system according to claim 13, further comprising an orchestration layer implemented above a number of different independent middlebox entities, the orchestration layer being configured:

to receive subscription requests from the at least two end hosts; and to receive information about local authentication of the in-network services from the different independent middlebox entities.

17. The system according to claim 16, wherein the different independent middlebox entities form a federation of middlebox entities, with each middlebox entity of the federation being configured to either resolve incoming subscription requests locally, or to forward them to another middlebox entity of the federation.

18. The communication system according to claim 13, wherein the at least two end hosts are at least two end users.

19. The communication system according to claim 18, wherein the at least two end users are one client and one server.

20. A middlebox entity for inserting in-network services, provided by at least one in-network service provider, in an end-to-end communication path between two end users, the middlebox entity comprising a processor and a non-transitory memory coupled to the processor and having processor-executable instructions stored thereon, which when executed, cause the middlebox entity to perform a method, comprising:

performing a registration procedure that comprises registering the in-network services together with their respective service level agreements;

receiving a subscription for the in-network services from at least one of the two end users together with a policy list containing at least host-specific security requirements;

evaluating potential conflicts between the host-specific security requirements and the service level agreements of the in-network services, and, in response to no conflicts being detected, authenticating the in-network services; and inserting the authenticated in-network services within the end-to-end communication path and enabling encrypted communication between the two end users to start, wherein the at least one middlebox entity is independent from the two end users.

* * * * *